(12) United States Patent
Kanoh et al.

(10) Patent No.: US 10,940,860 B2
(45) Date of Patent: Mar. 9, 2021

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Tadahiko Kanoh, Wako (JP); Yuta Takada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 84 days.

(21) Appl. No.: 16/292,464

(22) Filed: Mar. 5, 2019

(65) Prior Publication Data

US 2019/0276020 A1    Sep. 12, 2019

(30) Foreign Application Priority Data

Mar. 12, 2018 (JP) .............................. JP2018-044655

(51) Int. Cl.
*B60W 30/14* (2006.01)
*G06K 9/00* (2006.01)

(52) U.S. Cl.
CPC ....... *B60W 30/146* (2013.01); *G06K 9/00818* (2013.01); *B60W 2554/804* (2020.02); *B60W 2555/60* (2020.02)

(58) Field of Classification Search
CPC ........... G06K 9/00818; G06K 9/00832; G06K 9/00845; G06K 9/00791; G06K 9/00805; G06K 9/00798; G06K 9/6288; B60W 30/146; B60W 30/181; B60W 30/186; B60W 30/18; B60W 30/162; B60W 2554/00; B60W 2555/60; B60W 2554/804; B60W 30/14; B60W 50/08

See application file for complete search history.

(56) References Cited

U.S. PATENT DOCUMENTS 7,616,781 B2 * 11/2009 Schofield ................. H04N 7/18
                                                    382/104
8,064,643 B2 * 11/2011 Stein ................... G06K 9/00818
                                                    382/104

(Continued)

FOREIGN PATENT DOCUMENTS

JP        10-315801        12/1998

*Primary Examiner* — Hunter B Lonsberry
*Assistant Examiner* — Luis A Martinez Borrero
(74) *Attorney, Agent, or Firm* — Amin, Turocy & Watson, LLP

(57) ABSTRACT

A vehicle control device includes a recognizer 130 which recognizes a surrounding situation of a host vehicle and a driving controller 140 and 160 which executes driving control by controlling one or both of steering and acceleration/deceleration of the host vehicle on the basis of the surrounding situation recognized by the recognizer, wherein the driving controller assigns predetermined required tasks to an occupant of the host vehicle to execute the driving control when there is a gap of a threshold value or more between first speed information determined from at least one of a traveling speed of the host vehicle and a target speed and second speed information determined from at least one of a speed limit in a lane in which the host vehicle is traveling and a speed of a neighboring vehicle traveling around the host vehicle.

10 Claims, 7 Drawing Sheets

(56) References Cited

U.S. PATENT DOCUMENTS

| | | | |
|---|---|---|---|
| 8,831,813 B1* | 9/2014 | Ferguson | B60T 7/22 |
| | | | 701/23 |
| 9,566,983 B2* | 2/2017 | Harda | B60W 30/146 |
| 9,791,857 B2* | 10/2017 | Ebe | B60W 30/14 |
| 10,407,078 B2* | 9/2019 | Ratnasingam | G05D 1/0088 |
| 10,579,070 B1* | 3/2020 | Konrardy | B60P 3/12 |
| 2002/0016653 A1* | 2/2002 | Levine | B60K 31/00 |
| | | | 701/1 |
| 2010/0204896 A1* | 8/2010 | Biondo | B60W 30/143 |
| | | | 701/93 |
| 2016/0129908 A1* | 5/2016 | Harda | G05D 1/0088 |
| | | | 701/24 |
| 2016/0357187 A1* | 12/2016 | Ansari | G01S 13/862 |
| 2016/0357188 A1* | 12/2016 | Ansari | G06K 9/00805 |
| 2016/0357262 A1* | 12/2016 | Ansari | G06Q 10/0833 |
| 2016/0358477 A1* | 12/2016 | Ansari | G06Q 30/0251 |
| 2017/0066452 A1* | 3/2017 | Scofield | G08G 1/096725 |
| 2017/0261974 A1* | 9/2017 | Ebe | B60W 50/14 |
| 2017/0305434 A1* | 10/2017 | Ratnasingam | B60W 40/09 |
| 2017/0313324 A1* | 11/2017 | Kumai | B60W 40/08 |
| 2018/0284759 A1* | 10/2018 | Michalakis | B60W 30/02 |
| 2019/0049958 A1* | 2/2019 | Liu | G01S 17/89 |
| 2019/0283757 A1* | 9/2019 | Honda | B60W 30/165 |
| 2020/0172122 A1* | 6/2020 | Mimura | B60K 35/00 |

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2018-044655, filed Mar. 12, 2018, the content of which is incorporated herein by reference.

BACKGROUND

Field of the Invention

The present invention relates to a vehicle control device, a vehicle control method, and a storage medium.

Description of Related Art

Recently, research on automated control of vehicles has been conducted. With respect to this, a technique for performing travel control such that a vehicle travels at a constant speed, and detecting the occurrence of an event that will cause cancelation of constant-speed travel and the position at which the event will occur in advance, and canceling constant-speed travel before the vehicle arrives at the position is known (for example, Japanese Unexamined Patent Application, First Publication No. Hei 10-315801).

SUMMARY

This conventional technique merely cancels constant-speed travel control when conditions are satisfied and there are cases in which an inherent degree of driving control cannot be adjusted as necessary in a situation in which driving control is required.

An object of an aspect of the present invention devised in view of the aforementioned circumstances is to provide a vehicle control device, a vehicle control method and a storage medium by which it is possible to appropriately adjust a degree of driving control in a situation in which driving control is required.

A vehicle control device, a vehicle control method and a storage medium according to the present invention employed the following configurations.

(1): One aspect of the present invention is a vehicle control device including: a recognizer which recognizes a surrounding situation of a host vehicle; and a driving controller which executes driving control by controlling one or both of steering and acceleration/deceleration of the host vehicle on the basis of the surrounding situation recognized by the recognizer, wherein the driving controller assigns predetermined required tasks to an occupant of the host vehicle to execute the driving control when there is a gap of a threshold value or more between first speed information determined from at least one of a traveling speed of the host vehicle and a target speed and second speed information determined from at least one of a speed limit in a lane in which the host vehicle is traveling and a speed of a neighboring vehicle traveling around the host vehicle.

(2): In the aspect of (1), the predetermined required tasks includes one or both of monitoring surroundings of the host vehicle and an operation of a driving operator of the host vehicle.

(3): In the aspect of (1), the driving controller changes the threshold value on the basis of the speed of the neighboring vehicle traveling around the host vehicle.

(4): In the aspect of (1), the driving controller performs correction for reducing the number of required tasks assigned to the occupant or assigning no required task to the occupant when there is a gap of the threshold value or more between the first speed information and the second speed information and there is not a gap of the threshold value or more between the first speed information and the speed of the neighboring vehicle.

(5): In the aspect of (1), the driving controller changes the threshold value on the basis of a speed of a road sign recognized by the recognizer.

(6): In the aspect of (1), the driving controller determines whether there is a gap of the threshold value or more between the first speed information and the speed of the neighboring vehicle when a speed limit has not been recognized by the recognizer in a predetermined time or a predetermined distance.

(7): Another aspect of the present invention is a vehicle control method by which a vehicle control device recognizes a surrounding situation of a host vehicle, executes driving control by controlling one or both of steering and acceleration/deceleration of the host vehicle on the basis of the recognized surrounding situation, and assigns predetermined required tasks to an occupant of the host vehicle to execute the driving control when there is a gap of a threshold value or more between first speed information determined from at least one of a traveling speed of the host vehicle and a target speed and second speed information determined from at least one of a speed limit in a lane in which the host vehicle is traveling and a speed of a neighboring vehicle traveling around the host vehicle.

(8): Another aspect of the present invention is a computer readable non-transitory storage medium storing a program for causing a vehicle control device: to recognize a surrounding situation of a host vehicle; to execute driving control by controlling one or both of steering and acceleration/deceleration of the host vehicle on the basis of the recognized surrounding situation; and to assign predetermined required tasks to an occupant of the host vehicle to execute the driving control when there is a gap of a threshold value or more between first speed information determined from at least one of a traveling speed of the host vehicle and a target speed and second speed information determined from at least one of a speed limit in a lane in which the host vehicle is traveling and a speed of a neighboring vehicle traveling around the host vehicle.

According to the above-described aspects of (1) to (8), it is possible to appropriately adjust a degree of driving control in a situation in which driving control is required.

DESCRIPTION OF EMBODIMENTS

Hereinafter, an embodiment of a vehicle control device, a vehicle control method and a storage medium of the present invention will be described with reference to the drawings. A vehicle control device of an embodiment is applied to automated driving vehicles. Automated driving is to perform driving control by controlling one or both of steering and acceleration/deceleration of a vehicle and is a kind of driving assistance, for example. In an embodiment, it is assumed that driving assistance includes a first degree, a second degree that is a control degree higher than the first degree, and a third degree that is a control degree higher than the second degree, for example. A high control degree refers to a high rate of automation in driving control and a low task assigned to a driver, for example. Tasks assigned to a driver include monitoring of surroundings of a vehicle, operation of a driving operator (e.g., operation of holding a steering wheel), and the like, for example. Driving assistance of the first degree includes manual driving. It is assumed that an "occupant" in an embodiment is an occupant seating on a driver's seat, that is, a seat at which driving operators are provided, for example. Although cases in which the law of left-hand traffic is applied will be described hereinafter, the left and right sides may be changed when the law of right-hand traffic is applied.

[Overall Configuration]

Figure 1:
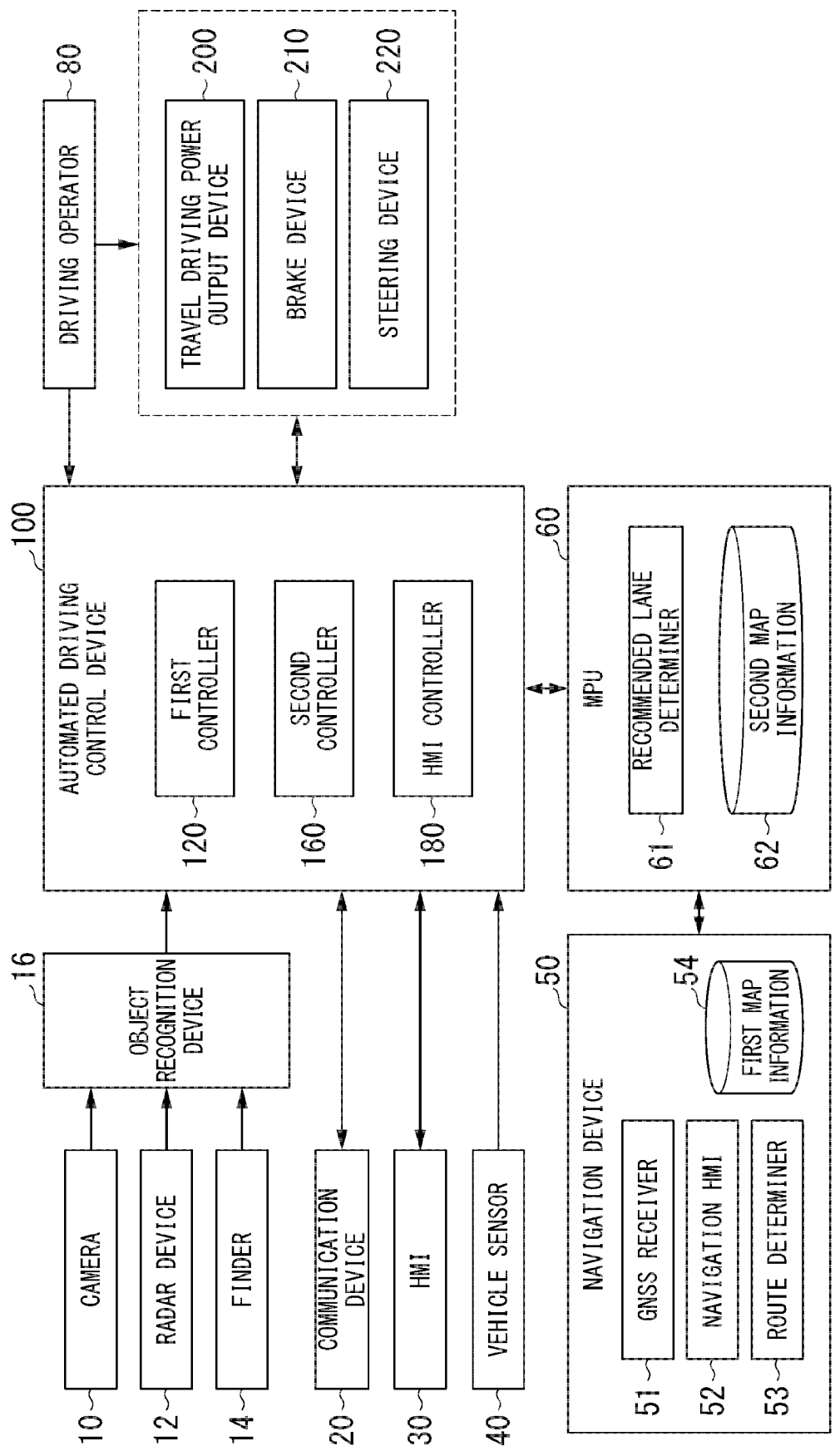
FIG. 1 is a block diagram of a vehicle system using a vehicle control device according to an embodiment.

FIG. 1 is a block diagram of a vehicle system 1 using a vehicle control device according to an embodiment. For example, a vehicle equipped with the vehicle system 1 is a two-wheeled, three-wheeled, four-wheeled vehicle or the like and a driving source thereof includes an internal combustion engine such as a diesel engine or a gasoline engine, a motor or a combination thereof. The motor operates using power generated by a generator connected to the internal combustion engine or power discharged from a secondary battery or a fuel battery.

For example, the vehicle system 1 may include a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving power output device 200, a brake device 210, and a steering device 220. These devices and apparatuses are connected through a multiplex communication line such as a controller area network (CAN), and a serial communication line, a wireless communication network, and the like. The configuration shown in FIG. 1 is merely an example and a part of the configuration may be omitted or other configurations may be further added. The automated driving control device 100 is an example of a "vehicle control device."

For example, the camera 10 may be a digital camera using a solid state imaging device such as a charge coupled device (CCD) or a complementary metal oxide semiconductor (CMOS). The camera 10 is attached to any portion of a vehicle in which the vehicle system 1 is mounted (hereinafter, a host vehicle M). When a front view image is captured, the camera 10 is attached to the upper part of the front windshield, the rear side of a rear view mirror, or the like. For example, the camera 10 may periodically repeatedly capture images of the surroundings of the host vehicle M. The camera 10 may be a stereo camera.

The radar device 12 radiates electric waves such as millimeter waves to the surroundings of the host vehicle M and detects electric waves (reflected waves) reflected by an object to detect the position (distance and direction) of the object. The radar device 12 is attached to any portion of the host vehicle M. The radar device 12 may detect the position and speed of an object according to a frequency modulated continuous wave (FM-CW) method.

The finder 14 is a light detection and ranging (LIDAR) device. The finder 14 radiates light to the surroundings of the host vehicle M and measures scattering light. The finder 14 detects a distance to a target on the basis of a time from light emission to light reception. Radiated light may be pulse-shaped laser light, for example. The finder 14 is attached to any portion of the host vehicle M.

The object recognition device 16 performs a sensor fusion process on detection results of some or all of the camera 10, the radar device 12 and the finder 14 to recognize the position, type, speed and the like of an object. The object recognition device 16 outputs a recognition result to the automated driving control device 100. The object recognition device 16 may output detection results of the camera 10, the radar device 12 and the finder 14 to the automated driving control device 100 as they are. The object recognition device 16 may be omitted from the vehicle system 1. The camera 10 includes an infrared camera that captures variations in the surface temperature of an object in addition to a camera that captures normal images. The camera 10 may be a camera that switches normal imaging and infrared imaging according to a function included therein.

The communication device 20 communicates with other vehicles around the host vehicle M using a cellular network, a Wi-Fi network, Bluetooth (registered trademark), dedicated short range communication (DSRC) and the like, for example, or communicates with various server devices through a wireless base station.

The HMI 30 presents various types of information to an occupant of the host vehicle M and receives an input operation from the occupant. The HMI 30 includes various display devices, speakers, buzzers, touch panels, switches, keys, light-emitting devices provided in the interior of a vehicle, etc.

The vehicle sensor 40 includes a vehicle speed sensor that detects the speed (traveling speed) of the host vehicle M, an acceleration sensor that detects an acceleration, a yaw rate sensor that detects an angular velocity around a vertical axis, a heading sensor that detects the direction of the host vehicle M, etc.

The navigation device 50 may include a global navigation satellite system (GNSS) receiver 51, a navigation HMI 52 and a route determiner 53, for example. The navigation device 50 stores first map information 54 in a storage device such as a hard disk drive (HDD) or a flash memory. The GNSS receiver 51 identifies the position of the host vehicle M on the basis of signals received from a GNSS satellite. The position of the host vehicle M may be identified or complemented by an inertial navigation system (INS) using the output of the vehicle sensor 40. The navigation HMI 52 includes a display device, a speaker, a touch panel, keys, etc. A part or all of the navigation HMI 52 and the aforementioned HMI 30 may be made to be common. The route determiner 53 determines a route (hereinafter, a route on a map) to a destination input by an occupant using the navigation HMI 52 from the position of the host vehicle M identified by the GNSS receiver 51 (or any input position) with reference to the first map information 54, for example. The first map information 54 is information representing road shapes according to links indicating roads and nodes connected by links, for example. The first map information 54 may include information about road signs with respect to links. For example, road signs may include a speed sign indicating a speed limit, for example. Road signs may include a sidewalk drawn on a road surface, a stop line, a speed indication, etc. Information about road signs may be set in the first map information 54 as default or acquired from a map server and the like through the Internet and the like. The first map information 54 may include information about legal speed limits established by law with respect to links. The first map information 54 may include curvature and point of interest (POI) information of roads, and the like. A route on a map is output to the MPU 60. The navigation device 50 may perform route guide using the navigation HMI 52 on the basis of roads on a map. For example, the navigation device 50 may be realized by functions of a terminal device such as a smartphone or a tablet terminal possessed by an occupant. The navigation device 50 may transmit a current position and a destination to a navigation server through the communication device 20 and acquire the same route as a route on a map from the navigation server.

The MPU 60 includes a recommended lane determiner 61, for example, and stores second map information 62 in a storage device such as an HDD or a flash memory. The recommended lane determiner 61 divides a route on a map provided from the navigation device 50 into a plurality of blocks (divides the route into intervals of 100$m$ in a vehicle traveling direction, for example) and determines a recommended lane for each block with reference to the second map information 62. The recommended lane determiner 61 performs determination in such a manner that on which lane from the left the vehicle will travel is determined. When a route on a map includes a branch point, the recommended lane determiner 61 determines recommended lanes such that the host vehicle M can travel on a reasonable route for traveling to a branch destination.

The second map information 62 is map information with higher-accuracy than the first map information 54. For example, the second map information 62 may include information on the centers of lanes or information on the boundaries of lanes. The second map information 62 may include road information, traffic regulations information, address information (addresses and zip codes), facility information, telephone number information, etc. The second map information 62 may be updated at any time through communication between the communication device 20 and other devices.

The driving operator 80 includes an accelerator pedal, a brake pedal, a shift lever, a steering wheel, a modified steering wheel, a joystick and other operators, for example. A sensor that detects an operation amount or presence or absence of an operation is attached to the driving operator 80 and a detection result thereof is output to the automated driving control device 100 or some or all of the travel driving power output device 200, the brake device 210 and the steering device 220.

The automated driving control device 100 includes a first controller 120, a second controller 160 and an HMI controller 180, for example. Each of these components is realized by a hardware processor such as a central processing unit (CPU) executing a program (software), for example. Some or all of these components may be realized by hardware (circuit unit; including circuitry) such as a large scale integration (LSI) circuit, an application specific integrated circuit (ASIC), a field-programmable gate array (FPGA) and a graphics processing unit (GPU) or realized by software and hardware in cooperation. Programs may be stored in advance in a storage unit of the automated driving control device 100, such as an HDD or a flash memory, or stored in a detachable storage medium such as a DVD or a CD-ROM and installed in the HDD or the flash memory of the automated driving control device 100 by setting the storage medium in a drive device. A combination of an action plan generator 140 and the second controller 160 is an example of a "driving controller." For example, the driving controller may perform driving control by controlling one or both of steering and acceleration/deceleration of the host vehicle M on the basis of a surrounding situation recognized by a recognizer 130.

Figure 2:
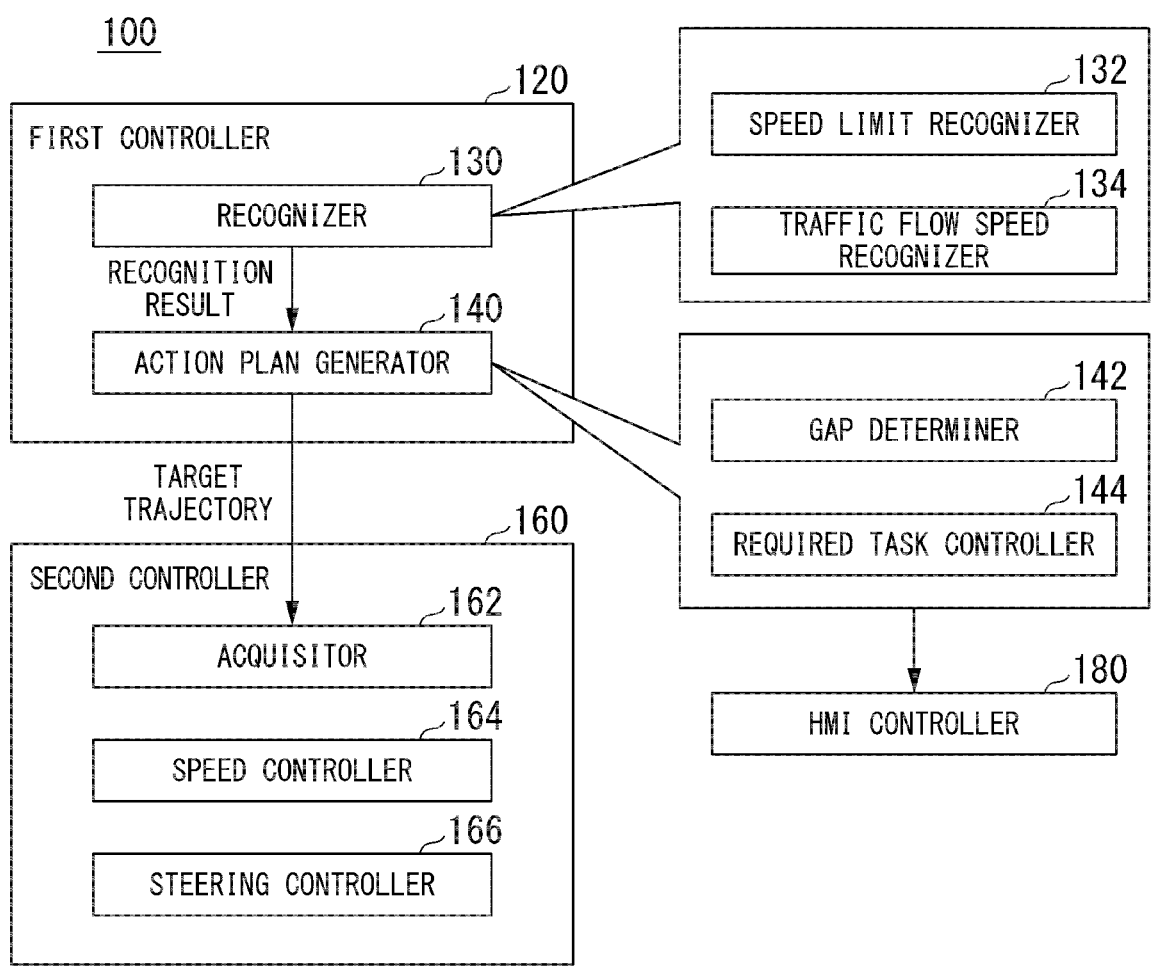
FIG. 2 is a diagram showing a functional configuration of a first controller, a second controller and an HMI controller.

FIG. 2 is a diagram showing a functional configuration of the first controller 120, the second controller 160 and the HMI controller 180. The first controller 120 includes the recognizer 130 and the action plan generator 140, for example. The first controller 120 realizes a function using artificial intelligence (AI) and a function using a model provided in advance in parallel, for example. For example, a function of "recognizing an intersection" may be realized by performing recognition of an intersection using deep learning or the like and recognition based on conditions provided in advance (which include a signal which can be pattern-matched, road markings and the like) in parallel and assigning scores to both the recognitions to integrally evaluate the recognitions. Accordingly, reliability of automated driving is secured.

The recognizer 130 recognizes states such as the position, speed and acceleration of an object around the host vehicle M on the basis of information input from the camera 10, the radar device 12 and the finder 14 through the object recognition device 16. For example, objects may include moving objects such as pedestrians and other vehicles and obstacles such as construction locations. For example, the position of an object may be recognized as a position on absolute coordinates having a representative point (the center of gravity, the center of the drive shaft or the like) of the host vehicle M as the origin and used for control. The position of an object may be represented as a representative point of the object, such as the center of gravity or a corner, or may be represented as a representative region. "States" of an object may include the acceleration and jerk of the object or an "action state" (e.g., whether lane change is being performed or is intended to be performed).

The recognizer 130 recognizes a lane (traveling lane) in which the host vehicle M is traveling, for example. For example, the recognizer 130 may recognize a traveling lane by comparing a lane marking pattern (e.g., arrangement of solid lines and dashed lines) obtained from the second map information 62 with a lane marking pattern around the host vehicle M recognized from an image captured by the camera 10. The recognizer 130 may recognize a traveling lane by recognizing lane boundaries (road boundaries) including lane markings, road shoulders, curbs, medians, guardrails and the like as well as lane markings. In such recognition, the position of the host vehicle M acquired from the navigation device 50 and a processing result of the INS may be additionally taken into account. The recognizer 130 may recognize the width, height, shape, vehicle type and the like of an obstacle on the basis of images captured by the camera 10. The recognizer 130 recognizes road signs, a red signal, tollgates, road structures and other road states.

The recognizer 130 recognizes a position and an attitude of the host vehicle M with respect to a traveling lane when the traveling lane is recognized. For example, the recognizer 130 may recognize a distance between a reference point of the host vehicle M and the center of the lane and an angle between a traveling direction of the host vehicle M and a line connecting the center of the lane as a relative position and attitude of the host vehicle M with respect to the traveling lane. Instead of this, the recognizer 130 may recognize the position of the reference point of the host vehicle M or the like with respect to any side edge of the traveling lane (a lane marking or a road boundary) as a relative position of the host vehicle M with respect to the traveling lane. The recognizer 130 may recognize a structure (e.g., an electric pole, a median or the like) on the basis of the first map information 54 or the second map information 62. Functions of a speed limit recognizer 132 and a traffic flow speed recognizer 134 of the recognizer 130 will be described later.

The action plan generator 140 generates a target trajectory through which the host vehicle M will automatically travel (without depending on an operation of a driver) in the future such that the host vehicle M travels in a recommended lane determined by the recommended lane determiner 61 in principle and can cope with a surrounding situation thereof. For example, a target trajectory may include a speed factor. For example, a target trajectory is represented as a sequential arrangement of points (trajectory points) at which the host vehicle M will arrive. A trajectory point is a point at which the host vehicle M will arrive for each predetermined traveling distance (e.g., approximately several meters) in a distance along a road, and a target speed and a target acceleration for each predetermined sampling time (e.g., approximately zero comma several seconds) are generated as a part of a target trajectory apart from trajectory points. For example, a target speed for each sampling time may be determined on the basis of a higher target speed set for each road to be passed. For example, the higher target speed may be determined on the basis of a speed limit and a legal speed or set by an occupant arbitrary or within a predetermined range from the speed limit and the legal speed. A target speed in the scope of the claim corresponds to the higher target speed, for example. A trajectory point may be a position at which the host vehicle M will arrive at a sampling time for each predetermined sampling time. In this case, information on a target speed and a target acceleration are represented by a spacing between trajectory points.

The action plan generator 140 may set an automated driving event upon generation of a target trajectory. Automated driving events include a constant-speed travel event, a low-speed following travel event, a lane change event, a branch event, a merging event, a takeover event, an avoiding event and the like. The action plan generator 140 generates a target trajectory in response to a started event. Functions of a gap determiner 142 and a required task controller 144 of the action plan generator 140 will be described later.

The second controller 160 controls the travel driving power output device 200, the brake device 210 and the steering device 220 such that the host vehicle M passes through a target trajectory generated by action plan generator 140 on scheduled time.

For example, the second controller 160 may include an acquisitor 162, a speed controller 164 and a steering controller 166. The acquisitor 162 acquires information on a target trajectory (trajectory points) generated by the action plan generator 140 and stores the information on a memory (not shown). The speed controller 164 controls the travel driving power output device 200 or the brake device 210 on the basis of a speed factor belonging to the target trajectory stored in the memory. The steering controller 166 controls the steering device 220 in response to a degree of bending of the target trajectory stored in the memory. Processing of the speed controller 164 and the steering controller 166 is realized by feedforward control and feedback control in combination, for example. As an example, the steering controller 166 performs feedforward control according to a curvature of a road ahead of the host vehicle M and feedback control based on a distance from a target trajectory in combination.

The HMI controller 180 outputs predetermined information to an occupant using the HMI 30. For example, the predetermined information may be information such as information for assigning a predetermined required task to an occupant and information about a degree of driving assistance.

The travel driving power output device 200 outputs a travel driving power (torque) for traveling of a vehicle to driving wheels. For example, the travel driving power output device 200 may include a combination of an internal combustion engine, a motor, a transmission and the like, and an electronic controller (ECU) which controls these components. The ECU controls the aforementioned components according to information input from the second controller 160 or information input from the driving operator 80.

The brake device 210 includes a brake caliper, a cylinder which transfers a hydraulic pressure to the brake caliper, an electric motor which generates a hydraulic pressure in the cylinder, and a brake ECU, for example. The brake ECU controls the electric motor according to information input from the second controller 160 and information input from the driving operator 80 such that a brake torque according to the control operation is output to each vehicle wheel. The brake device 210 may include a mechanism for transferring a hydraulic pressure generated by an operation of the brake pedal included in the driving operator 80 to the cylinder through a master cylinder as a backup. The brake device 210 is not limited to the above-described configuration and may be an electronically controlled hydraulic brake device which controls an actuator according to information input from the second controller 160 and transfers a hydraulic pressure of a master cylinder to a cylinder.

The steering device 220 includes a steering ECU and an electric motor, for example. For example, the electric motor may change the direction of the steering wheel by applying a force to a rack-and-pinion mechanism. The steering ECU drives the electric motor according to information input from the second controller 160 or information input from the driving operator 80 to change the direction of the steering wheel.

[Function of Speed Limit Recognizer]

Figure 3:
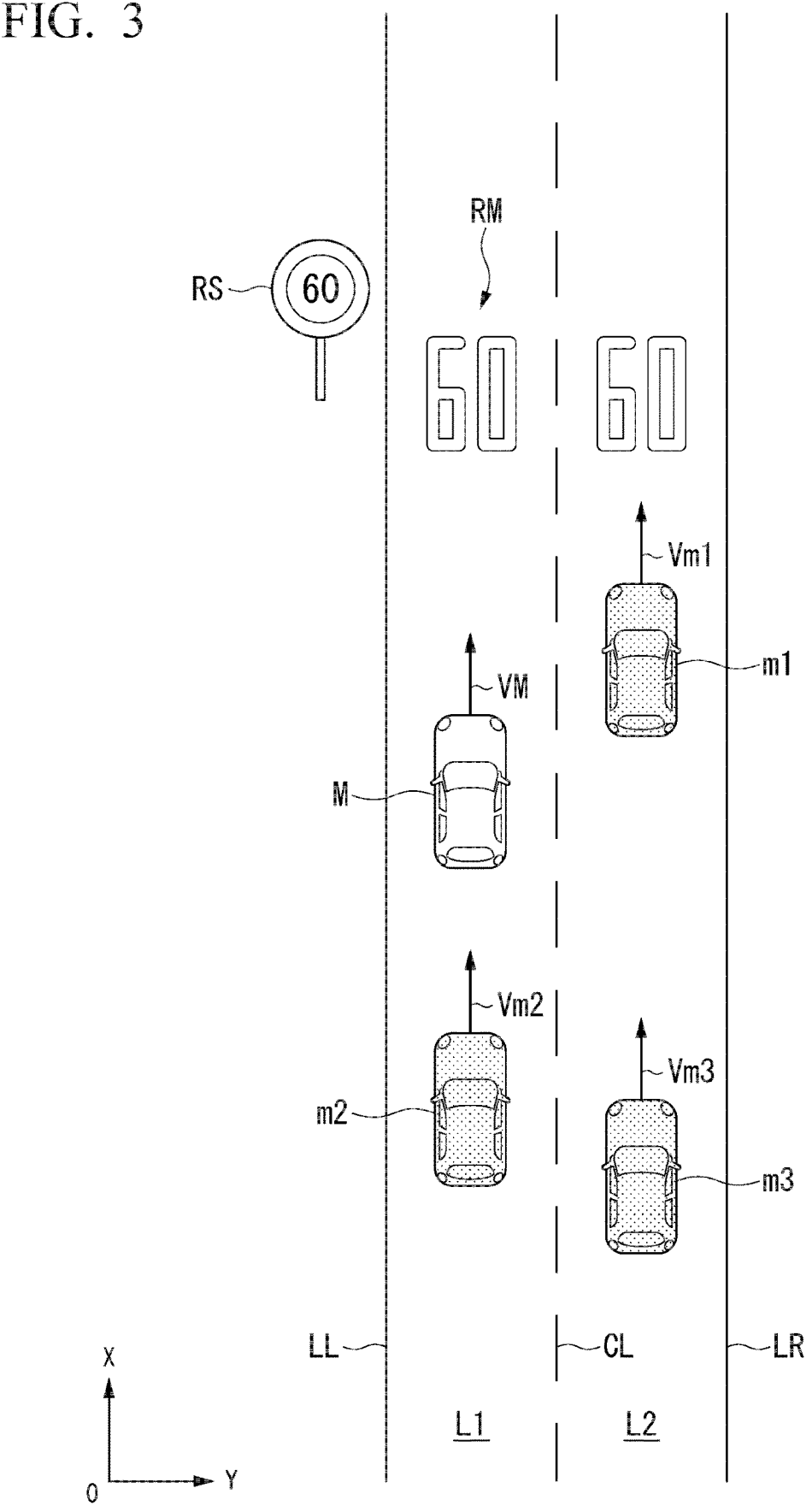
FIG. 3 is a diagram for describing processing of a speed limit recognizer.

The speed limit recognizer 132 recognizes a speed limit of a lane in which the host vehicle M is traveling. FIG. 3 is a diagram for describing processing of the speed limit recognizer 132. In the example of FIG. 3, a two-lane road is represented in the same direction and it is assumed that the host vehicle M is traveling in a left lane L1 between lanes L1 and L2 defined by lane markings LL and LR at a speed VM. In the example of FIG. 3, it is assumed that other vehicles m1 to m3 are present as neighboring vehicles of the host vehicle M and are respectively traveling at speeds Vm1 to Vm3 in the same direction as the direction of the host vehicle M (the extending direction of the road; X direction in the figure). In the description below, it is assumed that the host vehicle M is in a state in which driving assistance according to the third degree is performed and surrounding monitoring and an operation of the driving operator 80 (e.g., an operation of holding the steering wheel) are not performed by an occupant.

The speed limit recognizer 132 recognizes a speed limit of the lane L1 in which the host vehicle M is traveling. Specifically, the speed limit recognizer 132 extracts a speed sign RS on the basis of information such as shapes and colors among road signs recognized by the recognizer 130 and recognizes a speed indicated on the extracted speed sign RS as a speed limit. The speed limit recognizer 132 may recognize a speed limit from a road sign RM with respect to a speed sign among road signs recognized by the recognizer 130 and indicated on the road of the lane L1. The speed limit recognizer 132 may refer to positional information of the second map information 62, for example, using positional information of the host vehicle M and acquire a speed limit associated with a road link at a position corresponding thereto. For example, the speed limit recognizer 132 performs recognition of a speed limit at a timing, such as for each first predetermined time or for each change of a link of a road on which the host vehicle M is traveling. In the example of FIG. 3, the speed limit recognizer 132 recognizes the speed limit of 60 km/h of the lane L1 from the speed sign RS or the road sign RM.

[Function of Traffic Flow Speed Recognizer]

The traffic flow speed recognizer 134 recognizes a traffic flow speed on the basis of the speeds of neighboring vehicles traveling in the same traveling direction as that of the host vehicle M. Specifically, the traffic flow speed recognizer 134 derives an average speed from the speeds Vm1 to Vm3 of the other vehicles m1 to m3 recognized by the recognizer 130 and recognizes the derived average speed as a traffic flow speed. When the traffic flow speed recognizer 134 derives the average speed, the traffic flow speed recognizer 134 may perform a statistical correction process such as excluding abnormal values. When the traffic flow speed recognizer 134 derives the average speed, the traffic flow speed recognizer 134 may perform a correction process such as excluding the speed of a vehicle of a different vehicle type (e.g., a large vehicle such as a large bus or a trailer when the host vehicle M is a normal vehicle) or recognizing a traffic flow speed using only the speeds of other vehicles traveling in the same lane as the lane L1 in which the host vehicle M is traveling.

[Function of Gap Determiner]

The gap determiner 142 determines first speed information from at least one of the speed VM of the host vehicle M and a target speed and determines second speed information from at least one of a speed limit and a traffic flow speed in a lane in which the host vehicle M is traveling. For example, the gap determiner 142 may set one of the speed VM and the target speed as the first speed information on the basis of a surrounding situation and a road environment of the host vehicle M or set the average of the speed VM and the target speed or a value obtained by multiplying the respective speeds by a predetermined weight and adding up the resultant values as the first speed information. The gap determiner 142 may set one of a speed limit and a traffic flow speed as the second speed information on the basis of a surrounding situation and road environments of the host vehicle M or set the average of the speed limit and the traffic flow speed or a value obtained by multiplying the respective speeds by a predetermined weight and adding up the resultant values as the second speed information. In addition, the gap determiner 142 determines whether there is a gap between the determined first speed information and second speed information by a threshold value or more. Hereinafter, details of processing will be described by exemplifying specific speeds.

For example, the gap determiner 142 determines whether there is a gap between the speed VM of the host vehicle M and a speed limit recognized by the speed limit recognizer 132 or a traffic flow speed recognized by the traffic flow speed recognizer 134. The gap determiner 142 may determine whether there is a gap between a target speed of the host vehicle M and a speed limit recognized by the speed limit recognizer 132 or a traffic flow speed recognized by the traffic flow speed recognizer 134. Hereinafter, determination of a gap using the speed VM of the host vehicle M will be described. For example, the gap determiner 142 derives a difference between the speed VM of the host vehicle M and a speed limit, and when the derived difference speed (hereinafter referred to as a first difference speed) is equal to or greater than a threshold value, determines that there is a gap between the speed VM and the speed limit.

The gap determiner 142 derives a difference between the speed VM of the host vehicle M and a traffic flow speed recognized by the traffic flow speed recognizer 134, and when the derived difference speed (hereinafter referred to as a second difference speed) is equal to or greater than a threshold value, determines that there is a gap between the speed VM and the traffic flow speed.

Here, the gap determiner 142 may determine whether there is a gap equal to or greater than the threshold value between the speed VM of the host vehicle M and the traffic flow speed when the speed limit recognizer 132 cannot recognize a speed limit within a second predetermined time or within a predetermined distance. The second predetermined time is a longer time than the first predetermined time. Accordingly, in a situation in which a speed limit cannot be recognized (e.g., a situation in which a road marking or a road sign is covered by a preceding vehicle and thus cannot be recognized), for example, the gap determiner 142 can also perform determination.

The gap determiner 142 may determine whether there is a gap between the speed of the host vehicle M and the traffic flow speed when there is a gap between the speed VM of the host vehicle M and the speed limit instead of determining whether there is a gap between the speed of the host vehicle M and the traffic flow speed when the speed limit recognizer 132 cannot recognize the speed limit. Accordingly, it is possible to more appropriately perform determination of a gap by determining whether there is a gap between the speed VM and the traffic flow speed even when there is a gap between the speed VM of the host vehicle M and the speed limit due to congestion and the like in the lanes L1 and L2, for example Here, the threshold values may be predetermined fixed values or upper limit values and lower limit values thereof may be set. In this case, an upper limit value may be set to a value obtained by multiplying a reference speed by a predetermined weight a ($\alpha > 1$) and a lower limit value may be set to a value obtained by dividing the reference speed by a, for example. The gap determiner 142 may variably set the threshold values on the basis of a speed limit recognized by the speed limit recognizer, for example. In this case, the gap determiner 142 sets a speed of about 10 to 15% of the speed limit as the threshold value. Accordingly, it is possible to set an appropriate threshold value on the basis of road conditions of a traveling lane. Therefore, more appropriate gap determination can be performed. The threshold value may be set to a fixed speed.

For example, the gap determiner 142 may perform threshold value correction on the basis of a traffic flow speed around the host vehicle M. For example, the gap determiner 142 may perform correction in such a manner that the gap determiner 142 increases the current threshold value when the traffic flow speed is equal to or greater than a predetermined speed and decreases the current threshold value when the traffic flow speed is less than the predetermined speed. The gap determiner 142 may adjust an increase/decrease amount in response to the magnitude of the traffic flow speed. Accordingly, it is possible to perform more appropriate gap determination.

The gap determiner 142 may perform gap determination with respect to the speed VM of the host vehicle M on the basis of a predetermined speed determined in advance (e.g., a legal speed) or the like when a speed limit and a traffic flow speed cannot be recognized.

When the speed of a speed sign RS changes during traveling of the host vehicle M, a set speed or a target speed may be modified within a predetermined time from the change. The gap determiner 142 may not determine that there is a gap within the predetermined time from the time when the speed has changed. In this case, a task is not assigned by the required task controller 144 within the predetermined time from the time when the speed has changed and a task is assigned when the set speed or the target speed is not modified even after a lapse of the predetermined time. The aforementioned predetermined time may be appropriately modified according to a variation width of the speed sign RS, for example. In this case, the predetermined time is reduced when a speed difference is large compared to a case in which the speed difference is small. For example, when speed setting by an occupant is not changed constantly for the target speed even if the speed difference is large, the occupant may likely to overlook the change in the speed of the speed sign RS and the surrounding environment likely to change. Accordingly, it is desirable to set the predetermined time to be shorter in the case of a large speed difference than in the case of a small speed difference. The predetermined time may be set to be shorter in the case of a decreasing change (100→80 kph) than in the case of an increasing change (80→100 kph) even when the speed variation widths are identical.

[Function of Required Task Controller]

The required task controller 144 performs driving control for assigning a predetermined required task to an occupant of the host vehicle M when the gap determiner 142 determines that there is a gap of the threshold value or more between the speed VM of the host vehicle M and a speed limit or a traffic flow speed. For example, the predetermined required task may be a fixed required task or a required task set on the basis of a gap state. For example, gap states may include a gap when the speed VM of the host vehicle is lower than a speed limit or a traffic flow speed and a gap when the speed VM of the host vehicle is higher than the speed limit or the traffic flow speed.

For example, when the speed VM of the host vehicle M is lower than the speed limit or the traffic flow speed, the host vehicle M is likely to come into contact with other vehicles when temporarily moving to the lane L2 according to lane change because the host vehicle M is traveling at a lower speed than that of neighboring vehicles. Accordingly, the required task controller 144 sets a required task for causing the occupant to perform monitoring of the surroundings and operation of the driving operator 80 in order to execute driving assistance of the third degree to driving assistance (manual driving) of the first degree.

For example, when the speed VM of the host vehicle M is higher than the speed limit or the traffic flow speed, an object and the like that are not recognized by the recognizer 130 are likely to be present because the host vehicle M is traveling at a higher speed than that of neighboring vehicles. Accordingly, the required task controller 144 sets a required task for causing the occupant to perform monitoring of the surroundings in order to execute driving assistance of the third degree to driving assistance of the second degree. The required task controller 144 may set the same required task when the speed VM of the host vehicle is lower than a speed limit or a traffic flow speed and when the speed VM of the host vehicle M is higher than the speed limit or the traffic flow speed.

The required task controller 144 may correct a required task assigned to the occupant of the host vehicle M on the basis of a traffic flow speed. For example, when the gap determiner 142 determines that there is a gap between the speed VM of the host vehicle M and a speed limit and there is no gap between the speed VM of the host vehicle M and a traffic flow speed, the required task controller 144 may correct required tasks in such a manner that the required task controller 144 reduces the number of required tasks to be added (decreases the number of required tasks) or does not add a required task. Accordingly, when there is a gap between the speed VM of the host vehicle M and a speed limit due to congestion in the lanes L1 and L2, and the like, for example, it is also possible to perform driving control more appropriately.

Figure 4:
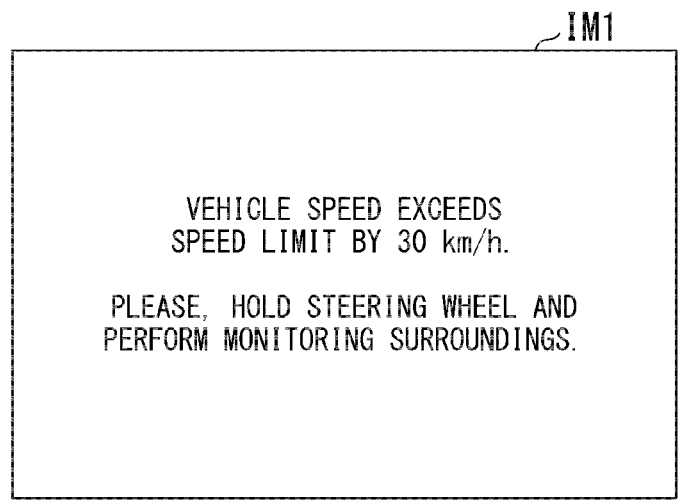
FIG. 4 is a diagram showing an example of an image including information for promoting an occupant to perform a required task.

The HMI controller 180 notifies information for promoting the occupant to perform a required task set by the required task controller 144 to the occupant through the HMI 30. FIG. 4 is a diagram showing an example of an image IM1 including the information for promoting the occupant to perform a required task. The HMI controller 180 generates the image IM1 displaying details of the required task and the reason why the required task needs to be performed (e.g., a state of the host vehicle M) on a display derive of the HMI 30. In the example of FIG. 4, information indicating "THE VEHICLE SPEED HAS EXCEEDED A SPEED LIMIT BY 30 KM/H. PLEASE HOLD THE STEERING WHEEL AND MONITOR THE SURROUNDINGS." is displayed. Accordingly, the occupant can more correctly recognize the reason why the required task is assigned and details of the required task.

The HMI controller 180 may generate audio information with the same details as those displayed in an image and notify the generated audio information to the occupant through a speaker of the HMI 30 instead of or in addition to screen display. The HMI controller 180 may perform control such as increasing the volume of the audio output and notifying the audio information to the occupant again or vibrating the seat of the occupant to cause the occupant to recognize the notification if the occupant has not executed a predetermined task even after elapse of a predetermined time from when the information for promoting the occupant to perform the required task has been notified to the occupant. When the required task is not executed even after the HMI controller 180 notifies the information for promoting the occupant to execute the required task to the occupant, the required task controller 144 may perform control for stopping the host vehicle M at the road side of the lane L1.

The required task controller 144 switches the degree of driving assistance from the third degree to the second degree or the first degree when it is determined that the occupant has executed the notified required task after the HMI controller 180 notifies the occupant of the required task. Determination of whether a required task has been executed can be performed in such a manner that determination is performed according to a detection result of a sensor provided in the driving operator 80 in the case of an operation of the driving operator 80, and an image captured by a camera (not shown) that captures images of the interior of the vehicle is analyzed and determination is performed on the basis of the direction of the face or gaze of the occupant included in the image in the case of monitoring of the surroundings, for example.

When the notified required task has been executed and the gap determiner 142 has determined that a gap of the threshold value or more is not present between the speed VM of the host vehicle M and the speed limit or the traffic flow speed, the required task controller 144 may stop requiring the task assigned to the occupant and perform control in a state before it was determined that there was a gap of the threshold value or more (i.e., driving control of the third degree). Accordingly, it is possible to smoothly change degrees of driving assistance to perform driving control more appropriately.

[Process Flow]

Figure 5:
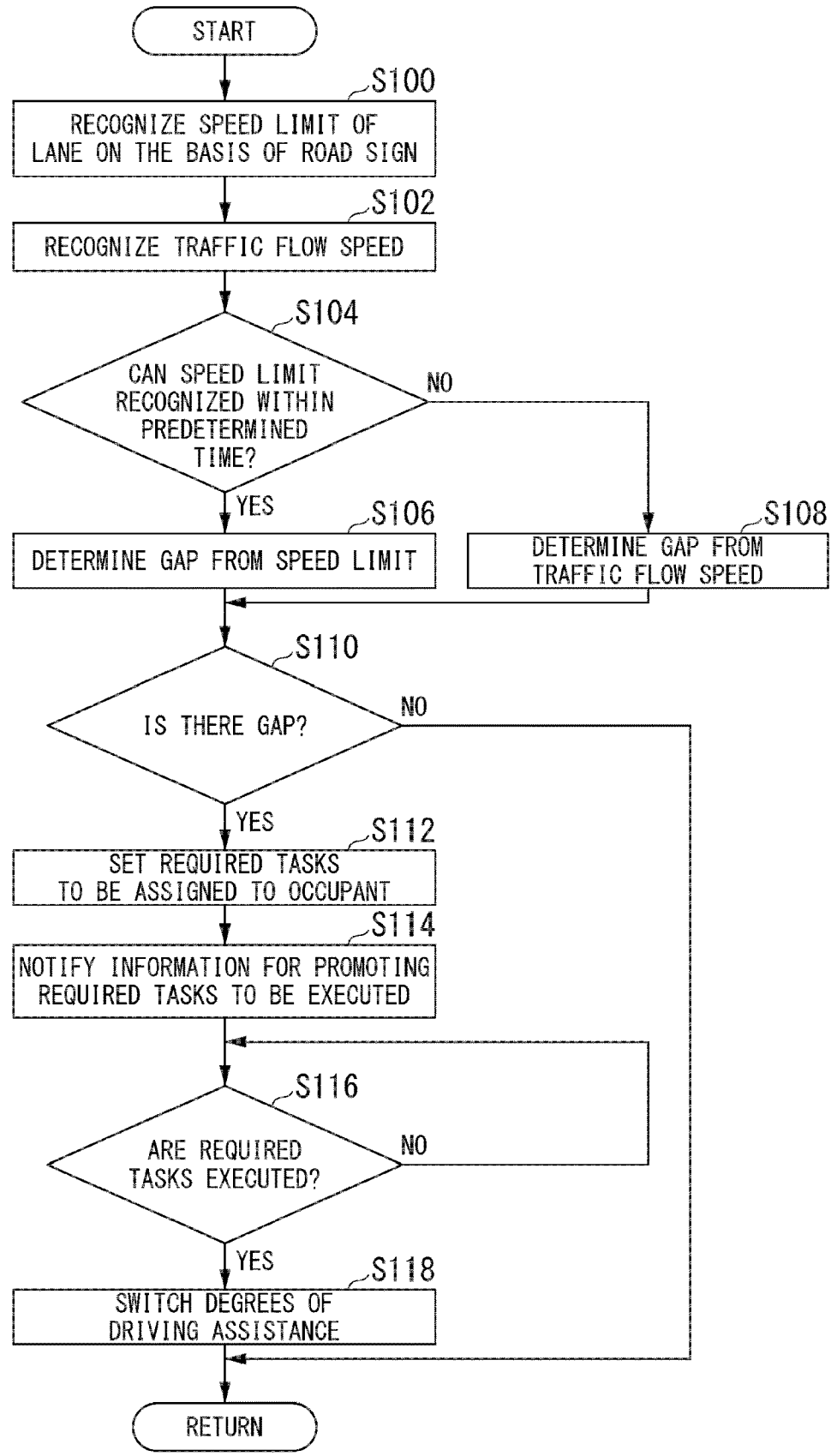
FIG. 5 is a flowchart showing a flow of a first process performed by an automated driving control device of an embodiment.

FIG. 5 is a flowchart showing a flow of a first process performed by the automated driving control device 100 of an embodiment. The process of this flowchart may be repeatedly performed at predetermined time intervals or at a predetermined timing, for example. It is assumed that the action plan generator 140 generates a target trajectory and the second controller 160 performs driving control of the third degree on the basis of the generated target trajectory when this flowchart starts.

First, the speed limit recognizer 132 recognizes a speed limit of a lane on the basis of a road sign with respect to the lane in which the host vehicle M is traveling, recognized by the recognizer 130 (step S100). Subsequently, the traffic flow speed recognizer 134 recognizes a traffic flow speed (step S102). Then, the gap determiner 142 determines whether the speed limit can be recognized within a predetermined time (second predetermined time) (step S104). When it is determined that the speed limit can be recognized within the predetermined time, the gap determiner 142 determines a gap between the speed VM of the host vehicle M and the speed limit (step S106). When it is determined that the speed limit cannot be recognized within the predetermined time, the gap determiner 142 determines a gap between the speed VM of the host vehicle M and the traffic flow speed (step S108).

Subsequently, the gap determiner 142 determines whether there is a gap between the speed VM of the host vehicle M and the speed of the comparison target (speed limit or the traffic flow speed) (step S110). When it is determined that there is a gap, the required task controller 144 sets a required task to be assigned to an occupant (step S112) and causes the HMI 30 to output information for promoting the set required task to be executed (step S114). Then, the required task controller 144 waits until the occupant executes the required task (step S116) and switches degrees of driving assistance when the required task has been executed (step S118). Accordingly, the process of this flowchart ends. The process of this flowchart also ends when it is determined that there is no gap in the process of step S110. When the required task is not executed even after a lapse of a predetermined time from when the information for promoting the required task to be executed in the aforementioned process of S116 has been notified to the occupant, the required task controller 144 may perform control for stopping the host vehicle M at the road side of the lane L1.

Figure 6:
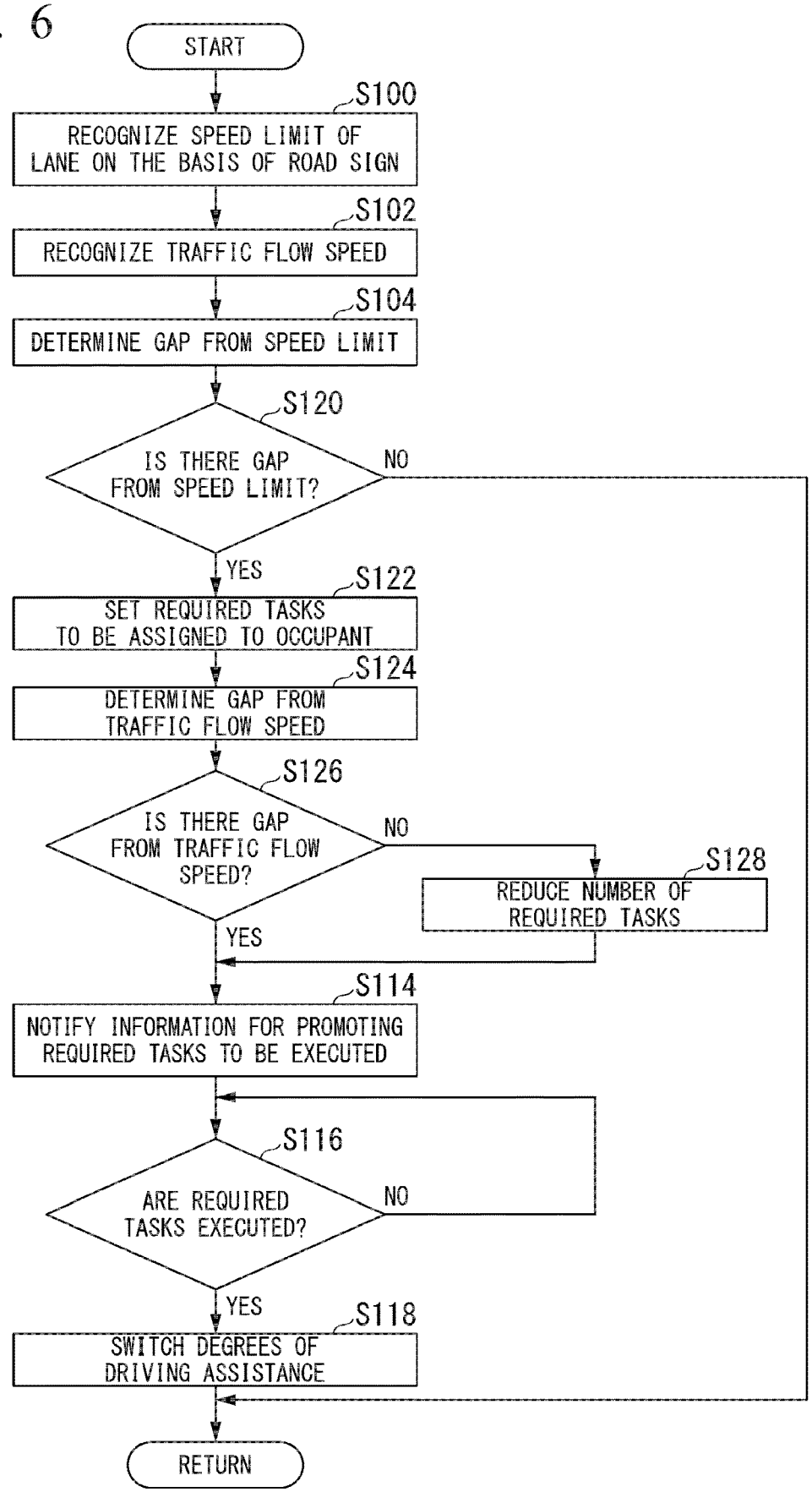
FIG. 6 is a flowchart showing a flow of a second process performed by the automated driving control device of the embodiment.

The automated driving control device 100 may perform gap determination with respect to both the speed limit and the traffic flow speed instead of the first process shown in FIG. 5. This process will be described below as a second process. FIG. 6 is a flowchart showing a flow of the second process performed by the automated driving control device 100 of an embodiment. The second process shown in FIG. 6 performs processes of steps S120 to S128 instead of the processes of step S104 to S112 of the first process shown in FIG. 5. Accordingly, the following description focuses on the processes of steps S120 to S128.

The gap determiner 142 determines whether there is a gap between the speed VM of the host vehicle M and the speed limit (step S120) after the process of step S104. When it is determined that there is a gap between the speed VM of the host vehicle M and the speed limit, the required task controller 144 sets required tasks to be assigned to the occupant (step S122). Subsequently, the gap determiner 142 performs gap determination with respect to the speed VM of the host vehicle M and the traffic flow speed (step S124) and determines whether there is a gap between the speed VM of the host vehicle M and the traffic flow speed (step S126). When it is determined that there is no gap between the speed VM of the host vehicle M and the traffic flow speed, the required task controller 144 performs correction for reducing the number of required tasks to less than that of the required tasks set in the process of step S122 (step S128). Processes after step S114 are performed. The required task controller 144 may omit the processes of step S114 to step S118 when required tasks are not assigned to the occupant in the process of step S128.

According to the above-described embodiment, the automated driving control device 100 can appropriately adjust a degree of driving control in a situation in which driving control is required by including the recognizer 130 which recognizes a surrounding situation of the host vehicle M, and a driving controller (action plan generator 140 and the second controller 160) which performs driving control by controlling one or both of steering and acceleration/deceleration of the host vehicle M on the basis of the surrounding situation recognized by the recognizer 130, wherein the driving controller assigns a predetermined required task to an occupant of the host vehicle M to execute driving control when there is a gap of a threshold value or more between first speed information determined from at least one of a traveling speed of the host vehicle M and a target speed and second speed information determined from at least one of a speed limit in a lane in which the host vehicle M is traveling and a speed of a neighboring vehicle traveling around the host vehicle M. According to the present embodiment, it is possible to perform more appropriate driving assistance without causing a driver to override control of the vehicle system 1 by requesting an appropriate task to be performed by the driver in response to traveling conditions of the host vehicle M.

[Hardware Configuration]

Figure 7:
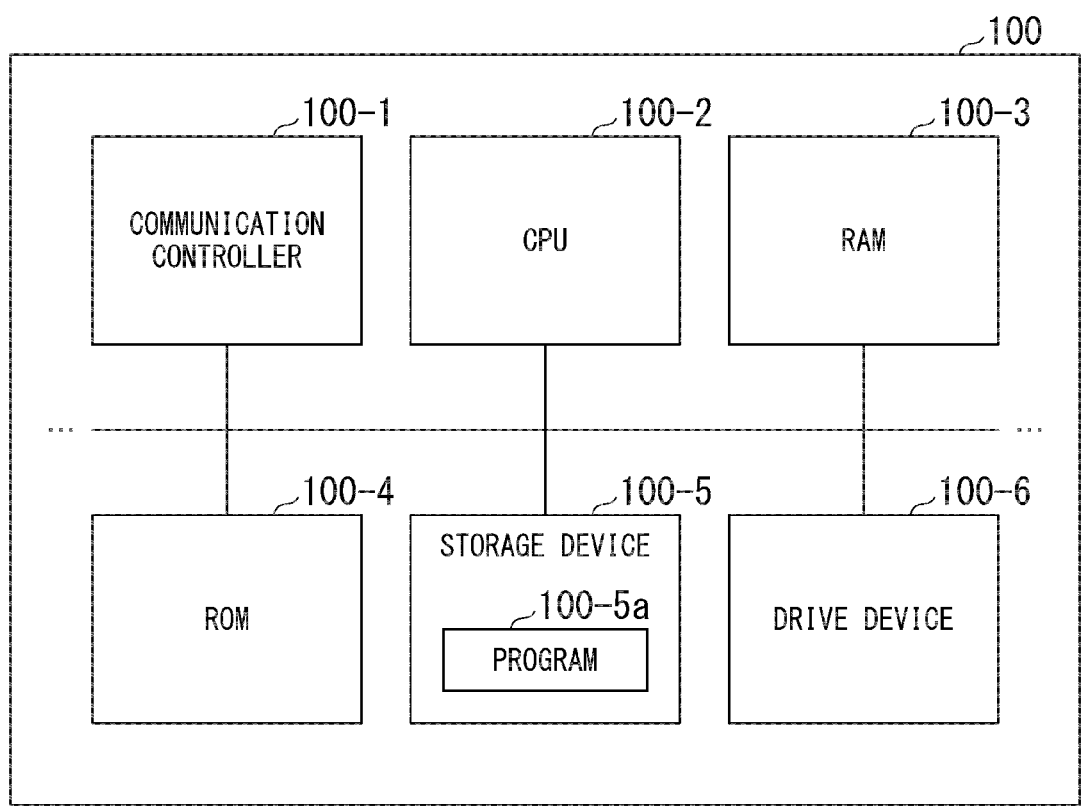
FIG. 7 is a diagram showing an example of a hardware configuration of the automated driving control device of the embodiment.

FIG. 7 is a diagram showing an example of a hardware configuration of the automated driving control device 100 of embodiments. As illustrated, the automated driving control device 100 has a configuration in which a communication controller 100-1, a CPU 100-2, a RAM 100-3 used as a working memory, a ROM 100-4 storing a boot program and the like, a storage device 100-5 such as a flash memory or an HDD, a drive device 100-6 and the like are connected through an internal bus or a dedicated communication line. The communication controller 100-1 performs communication with components other than the automated driving control device 100. A program 100-5a executed by the CPU 100-2 is stored in the storage device 100-5. This program is developed in the RAM 100-3 according to a direct memory access (DMA) controller (not shown) or the like and executed by the CPU 100-2. Accordingly, a part or all of the first controller 120, the second controller 160 and the HMI controller 180 of the automated driving control device 100 are realized.

The above-described embodiment can be represented as follows.

A vehicle control device including:
a storage device which stores a program; and
a hardware processor,
wherein the hardware processor is configured to, by executing the program stored in the storage device:
recognize a surrounding situation of a host vehicle;
execute driving control by controlling one or both of steering and acceleration/deceleration of the host vehicle on the basis of the recognized surrounding situation; and
assign a predetermined required task to an occupant of the host vehicle to execute the driving control when there is a gap of a threshold value or more between first speed information determined from at least one of a traveling speed of the host vehicle and a target speed and second speed information determined from at least one of a speed limit in a lane in which the host vehicle is traveling and a speed of a neighboring vehicle traveling around the host vehicle.

While forms for embodying the present invention have been described using embodiments, the present invention is not limited to these embodiments and various modifications and substitutions can be made without departing from the spirit or scope of the present invention.

What is claimed is:

1. A vehicle control device comprising:
a storage device that stores a program; and
a hardware processor, wherein the hardware processor, by executing the program, is configured to:
recognize a surrounding situation of a host vehicle;
execute driving control by controlling one or both of steering and acceleration/deceleration of the host vehicle based on the surrounding situation;
generate a target trajectory through which the host vehicle is to automatically travel in the future;
assign predetermined required tasks to an occupant of the host vehicle to execute the driving control when the driving control is executed based on the target trajectory and there is a gap of a threshold value or more between first speed information and second speed information, the first speed information being determined from at least one of a traveling speed of the host vehicle and a target speed, the second speed information being determined from at least one of a speed limit in a lane in which the host vehicle is traveling and a speed of a neighboring vehicle traveling around the host vehicle; and
cause a rate of automation in driving control to be lower when it is determined that the occupant has executed the required tasks.

2. The vehicle control device of claim 1,
wherein the predetermined required tasks includes one or both of monitoring surroundings of the host vehicle and an operation of a driving operator of the host vehicle.

3. The vehicle control device of claim 1,
wherein the hardware processor changes the threshold value based on the speed of the neighboring vehicle traveling around the host vehicle.

4. The vehicle control device of claim 1,
wherein the hardware processor performs correction for reducing a number of required tasks assigned to the occupant or assigning no required task to the occupant when there is a gap of the threshold value or more between the first speed information and the second speed information and there is not a gap of the threshold value or more between the first speed information and the speed of the neighboring vehicle.

5. The vehicle control device of claim 1,
wherein the hardware processor changes the threshold value based on a recognized speed represented on a road sign.

6. The vehicle control device of claim 1,
wherein the hardware processor determines whether there is a gap of the threshold value or more between the first speed information and the speed of the neighboring vehicle when a speed limit has not been recognized in a predetermined time or a predetermined distance.

7. The vehicle control device of claim 1,
wherein, the hardware processor waits until the occupant executes the tasks without causing the rate of automation in driving control to be lower when it is not determined that the occupant has executed the required tasks.

8. The vehicle control device of claim 1,
wherein, the hardware processor assigns the predetermined required tasks to an occupant of the host vehicle to execute the driving control when the lane change is executed and there is a gap of a threshold value or more between the first speed information and the second speed information, and
the hardware processor causes the rate of automation in driving control to be lower when it is determined that the occupant has executed the required tasks, and waits until the occupant executes the required tasks without causing the rate of automation in driving control to be lower when it is not determined that the occupant has executed the required tasks.

9. A vehicle control method using a vehicle control device, the method comprising:
recognizing a surrounding situation of a host vehicle;
executing driving control by controlling one or both of steering and acceleration/deceleration of the host vehicle based on the surrounding situation;
generating a target trajectory through which the host vehicle is to automatically travel in the future;
assigning predetermined required tasks to an occupant of the host vehicle to execute the driving control when the driving control is executed based on the target trajectory and there is a gap of a threshold value or more between first speed information and second speed information, the first speed information being determined from at least one of a traveling speed of the host vehicle and a target speed, the second speed information being determined from at least one of a speed limit in a lane in which the host vehicle is traveling and a speed of a neighboring vehicle traveling around the host vehicle; and
causing a rate of automation in the driving control to be lower when it is determined that the occupant has executed the required tasks.

10. A computer readable non-transitory storage medium storing a program for causing a vehicle control device:
to recognize a surrounding situation of a host vehicle;
to execute driving control by controlling one or both of steering and acceleration/deceleration of the host vehicle based on the surrounding situation;

to generate a target trajectory through which the host vehicle is to automatically travel in the future;

to assign predetermined required tasks to an occupant of the host vehicle to execute the driving control when the driving control is executed based on the target trajectory and there is a gap of a threshold value or more between first speed information and second speed information, the first speed information being determined from at least one of a traveling speed of the host vehicle and a target speed, the second speed information being determined from at least one of a speed limit in a lane in which the host vehicle is traveling and a speed of a neighboring vehicle traveling around the host vehicle; and to cause a rate of automation in the driving control to be lower when it is determined that the occupant has executed the required tasks.

* * * * *